United States Patent [19]

Ross, Sr. et al.

[11] Patent Number: 4,484,772
[45] Date of Patent: Nov. 27, 1984

[54] ROTATABLE BELLOWS-LIKE COVER

[76] Inventors: Victor H. Ross, Sr., 111 Okinawa Dr.; Victor H. Ross, Jr., Old Apple Orchard - R.D. #3, both of New Castle, Pa. 16105

[21] Appl. No.: 361,457

[22] Filed: Mar. 24, 1982

[51] Int. Cl.³ .............................................. F16L 51/02
[52] U.S. Cl. ..................................... 285/226; 285/280
[58] Field of Search ............... 285/226, 280, 278, 260, 285/227; 138/121; 403/50, 51

[56] References Cited

U.S. PATENT DOCUMENTS

| | | | |
|---|---|---|---|
| 1,534,399 | 4/1925 | Kraft | 285/226 X |
| 3,284,264 | 11/1966 | O'Rourke | 285/226 |
| 3,642,309 | 2/1972 | Horrobin et al. | 403/50 X |
| 3,727,949 | 4/1973 | Kleykamp et al. | 285/280 X |
| 3,770,303 | 11/1973 | Hallett | 285/226 |
| 4,099,744 | 7/1978 | Kutnyak et al. | 285/280 X |

FOREIGN PATENT DOCUMENTS

| | | | |
|---|---|---|---|
| 742477 | 12/1932 | France | 138/121 |
| 866797 | 6/1941 | France | 138/121 |
| 537083 | 6/1941 | United Kingdom | 285/260 |

Primary Examiner—Thomas F. Callaghan
Attorney, Agent, or Firm—Harpman & Harpman

[57] ABSTRACT

Rotatable bellows-like covers made up of a number of sections, each formed from annular elements, incorporate a rotatable section permitting the cover to expand and contract lengthwise and simultaneously permit rotation of a portion thereof with respect to another portion. The rotatable bellows-like covers are particularly suitable for protectively enclosing movable mechanical arms on welding robots and the like and specifically the hinged portions thereof which are movable in angular relation to one another and rotatable with respect to one another.

3 Claims, 5 Drawing Figures

ROTATABLE BELLOWS-LIKE COVER

BACKGROUND OF THE INVENTION (1) Technical Field

This invention relates to bellows or concertina-type covers as used for protecting reciprocating and otherwise movable parts of machinery.

(2) Description of the Prior Art

The prior art covers are best illustrated in U.S. Pat. No. 3,642,309 wherein a bellows-like cover is made in at least two sections, each of which are formed from annular bellows-like assemblies and wherein annular end elements on the bellos-like sections take the form of apertured discs having radial slots which extend inwardly from the outer periphery of one of the elements and outwardly from the inner periphery of the other element to permit the coupling together of the sections. The arrangement is such that the sections of the cover can be readily connected together and readily disconnected by bringing the radially positioned oppositely disposed slots in the joining elements into registry with one another. Accidental registry of the slots will permit the ready disassembly of the sections of the cover and the undersirable exposure of the mechanical parts normally protected thereby.

A bellows-like cover permitting concertina-like movement as well as twisting movement may be seen in U.S. Pat. No. 4,125,130 wherein the bellows is made up of a plurality of co-axially joined bellows elements, each having a plurality of parallelogram shaped wall elements of thin material to permit twisting of the assembled bellows. The degree of twisting provided is limited and unusual flexing of the material of the bellows results in relatively short life and the exposure of mechanical devices on which the bellows is used for protecting the same.

A unitary bellos-type joint assembly for connecting tubular members is disclosed in U.S. Pat. No. 3,873,137, the joint assembly of the disclosure includes short tubular joint sections and a longer bellows section interposed therebetween and detachably connected to the short joint sections. An interlocking water-tight connection is thus formed and no provision is made for rotating a portion of the joint assembly with respect to another portion.

This invention provides all of the advantages of an extremely flexible bellows-like cover formed of a number of annular elements having central openings and joined to one another at their respective peripheral edges and having a unique and extremely simple inter-engaging arrangement of annular elements with center openings slidably engaged one within the other to provide a dust-tight closure which is both flexible longitudinally as in a conventional bellows and rotatable as desirable in covering an elbow-like joint in a mechanical device in which one part of the mechanical device moves at an angle with respect to the other and rotates relative thereto while in angular disposition.

SUMMARY OF THE INVENTION

A rotatable bellows-like cover comprises a number of sections, each formed from annular elements having central openings with the annular elements secured to one another at their inner and outer peripheries and wherein one of said annular elements is slidably positioned between an adjacent pair of said annular elements in unattached relation so as to be rotatable with respect thereto.

DESCRIPTION OF THE PREFERRED EMBODIMENT

Figure 1:
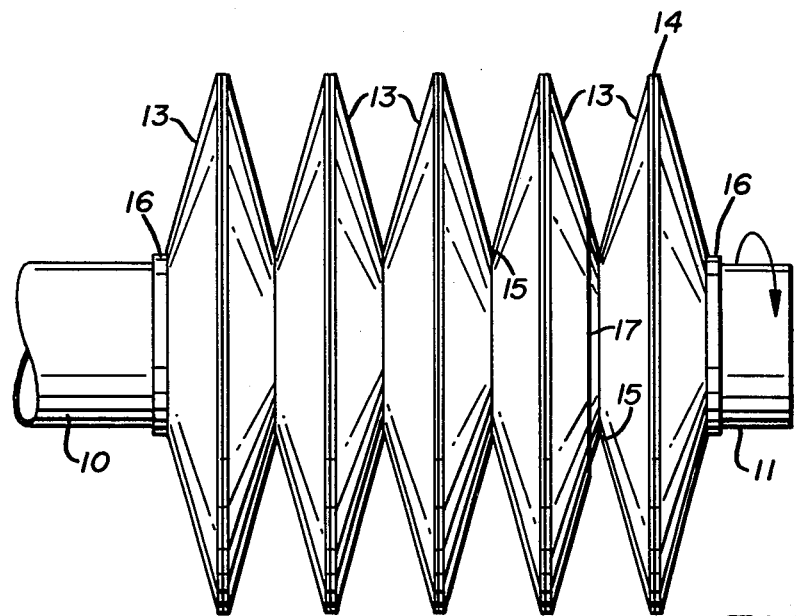
FIG. 1 is a side elevation of a rotatable bellows-like cover defining a hollow enclosed passageway therethrough.
Figure 2:
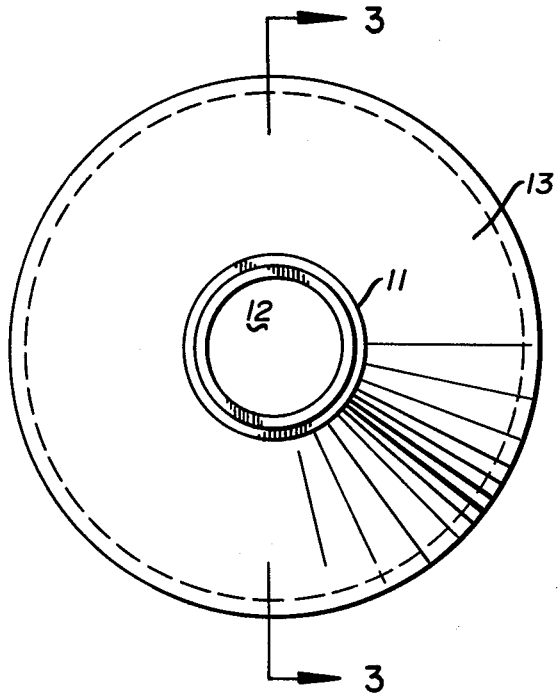
FIG. 2 is an end elevation of the cover illustrated in FIG. 1.
Figure 3:
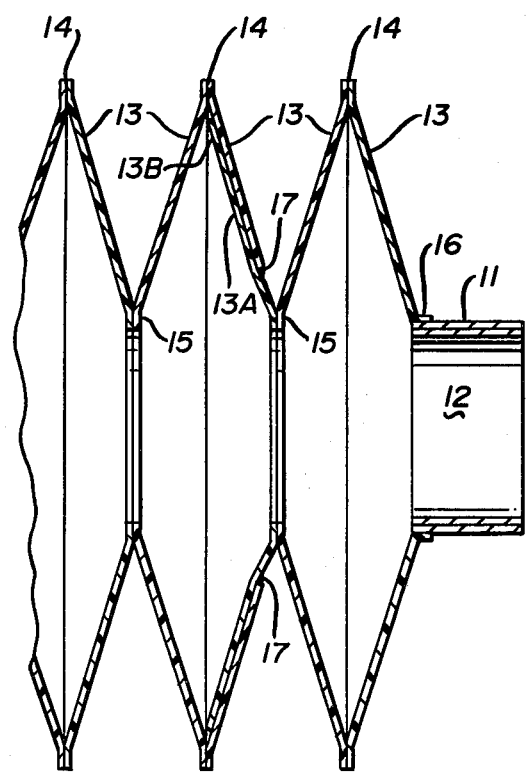
FIG. 3 is a vertical section on line 3—3 of FIG. 2.

In its simplest form, the rotatable bellows-like cover disclosed herein may be seen in FIGS. 1, 2 and 3 of the drawings and by referring thereto it will be seen that there are a pair of tubular members 10 and 11 which may be flexible or rigid and defining an axial passageway 12 therethrough and through a plurality of annular elements 13 and which comprise centrally apertured discs of flexible impervious material attached to one another as by sewing and/or heat sealing or otherwise at their outer peripheral edges 14 and their inner peripheral edges 15. The outermost end annular elements 13 are attached to the tubular members by sewing and/or heat sealing or the like at 16. Each of the annular elements 13 is normally positioned in a flattened semi-conical shape so that in assembly the annular elements 13 form a concertina-like continuous flexible cover in which opposed and connected pairs of the annular elements 13 form individual flexible bellow sections.

In order that the rotatable bellows-like cover illustrated in FIGS. 1, 2 and 3 of the drawings can be used to protectively enclose a mechanical arm or similar portion of a machine wherein portions of the arm are bendable and rotatable with respect to one another, an arrangement is provided wherein a portion of the cover formed of the plurality of annular elements 13 is rotatable with respect to another and about a common axis which may be either straight or curved depending upon the position of the portions of the mechanical device on which the cover is installed.

By referring now to FIG. 3 of the drawings in which an enlarged cross sectional elevation of the right end portion of the rotatable bellows-like cover of FIG. 1 may be seen, it will be observed that the first two centrally apertured annular elements 13 are secured to one another at their outer peripheral edges at 14 and that the first annular element 13, the one to the right in FIG. 3 is joined at its inner peripheral edge to the tubular member 11 as at 16. The inner peripheral edge of the second, from the right, of the centrally apertured annular elements 13 is joined at its inner peripheral edge as at 15 to the inner peripheral edge of the third centrally apertured annular element 13A with the outer peripheral edge of the centrally apertured annular element 13A being disposed immediately within the area defined by the joined outer peripheral edges of the adjacent two centrally apertured annular elements 13. The outer peripheral edge of the third centrally apertured annular element 13A is indicated at 13B in FIG. 3 of the drawings, and it will be observed that substantially the entire surface of the third centrally apertured annular element 13A is slidably engaged against the inner surface of the adjacent centrally apertured annular element 13. Each of the centrally apertured annular elements 13 extending to the left of the centrally apertured annular element 13 are joined to one another at their respective inner and outer peripheral edges so that an air-tight protective bellows-like cover is formed.

It will thus be seen that when the rotatable bellows-like cover, as illustrated in FIGS. 1, 2 and 3 of the drawings and hereinbefore described, is affixed over and about a mechanical device having a movable joint to be protected, the tubular member 11 at one end is attached to a portion of the device at one side of the movable and/or rotatable joint therein, while the tubular member 10 at the other end of the rotatable bellows-like cover is attached to the protected device at the other side of the joint to be protected. The arrangement is such that the movable device such as an electrode carrying arm on a welding robot can bend at an appropriate joint therein to any necessary angle and at the same time rotate while the bendable connection is either straight or angularly disposed. The rotatable function of the rotatable bellows-like cover is made possible by the sliding dust-tight engagement of the centrally apertured annular element 13A relative to the immediately adjacent centrally apertured annular element 13 as hereinbefore described.

It will occur to those skilled in the art that the material from which the plurality of centrally apertured annular elements 13 are formed is impervious and flexible, the centrally apertured annular element 13A may be advantageously formed of material which is somewhat stiffer than the material of the remaining centrally apertured annular elements 13 so as to insure its retention in dust-tight slidable engagement in the assembly as hereinbefore described.

In FIG. 3 of the drawings, the inner peripheral edge of the centrally apertured annular element 13 against which the centrally apertured annular element 13A is slidably engaged is indicated by the numeral 17.

It will thus be seen that the components of the rotatable bellows-like cover are of conventional form in that they are substantially the same as those which are normally used in concertina-type covers and are therefore capable of rapid and economic manufacture and assembly.

Figure 4:
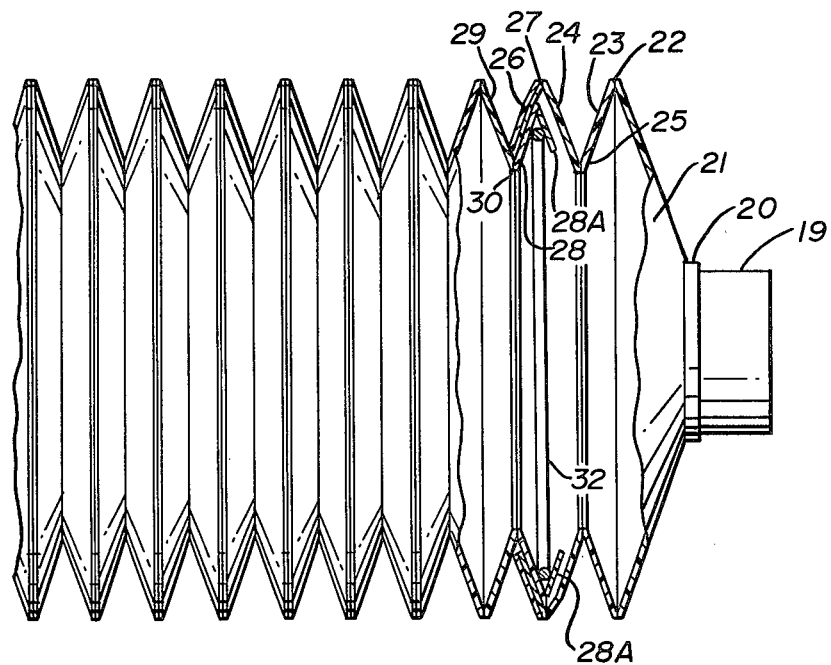
FIG. 4 is a side elevation of a modified form of the rotatable bellows-like cover with parts broken away and parts in cross section.
Figure 5:
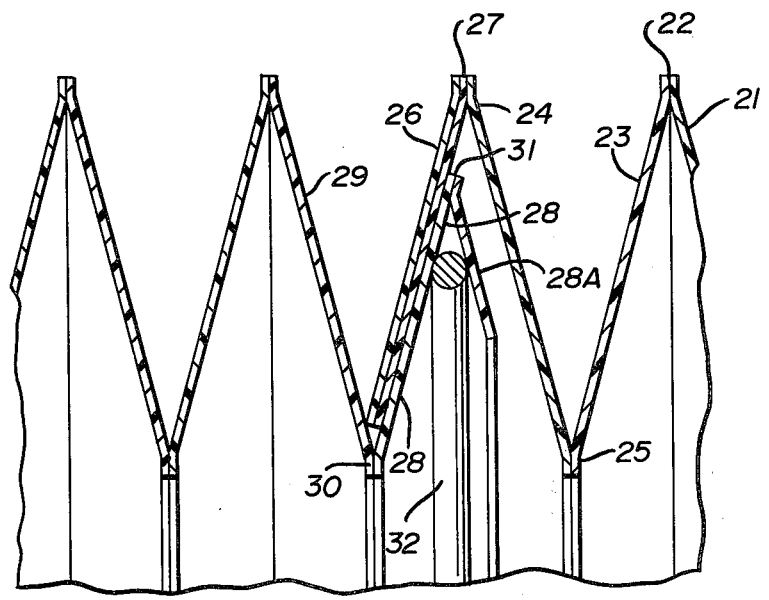
FIG. 5 is an enlarged detail view of a portion of the device seen in FIG. 4.

Modifications of the rotatable bellows-like cover hereinbefore disclosed are possible and one such modification which is particularly useful where the diameter of the rotatable bellows-like cover is substantially large may be seen by referring to FIGS. 4 and 5 of the drawings.

In FIG. 4, a tubular member 19 will be seen joined to the inner peripheral edge 20 of a centrally apertured annular element 21, the outer peripheral edge of which is joined as at 22 to the outer peripheral edge of an adjacent centrally apertured annular element 23. The inner peripheral edge of the apertured annular element 23 is joined to the inner peripheral edge of the centrally apertured annular element 24 as at 25, and it will be observed that the area defined by the apertures in the annular elements 23 and 24 is substantially greater in size than the comparable aperture defined in the preferred embodiment of the invention hereinbefore described.

In FIG. 4 and in enlarged detail in FIG. 5, the next centrally apertured annular element in the assembly is indicated at 26 as comprising a two-layer element joined at its outer peripheral edge to the outer peripheral edge of the centrally apertured annular element 24 as indicated at 27. The double layered centrally apertured annular element 26 is preferably relatively stiffer than the material from which the other centrally apertured annular elements are formed in this embodiment of the invention and it is disposed between the next pair, to the left, as seen in FIGS. 4 and 5 of the drawings, of centrally apertured annular elements 28 and 29, which are joined to one another at their inner peripheral edges at 30.

A secondary centrally apertured annular element 28A is joined to the outer peripheral edge of the centrally apertured annular element 28 as at 31 and by referring to FIG. 5 in particular, it will be seen that the centrally apertured annular element 28 is somewhat smaller in diameter than the centrally apertured double layered annular element 26 which is slidingly engages.

It will also be seen that the centrally apertured annular element 28A is of comparable outer diameter and may be formed with a larger inner diameter or cutaway area as compared with the centrally apertured annular element 28 to which is it joined at its outer peripheral edge as at 31.

In order that the relatively large diameter rotatable bellows-like cover of the modification seen in FIGS. 4 and 5 of drawings will positively maintain its assembled slidble or rotatable relation between the respective sections thereof, an annular rod 32 which may comprise an annular resilient member or an annular rigid or semi-rigid member is disposed in the area between the centrally apertured annular member 28 and its attached centrally apertured annular member 28A.

Alternately, or additionally, the material of the centrally apertured annular members 28 and 28A may be somewhat stiffer than the materials of the adjacent centrally apertured annular members 24 and 29 and if desired the double layered centrally apertured annular element 26 may be a single piece of relatively thicker material of a semi-rigid character.

It will thus be seen that a rotatable bellows-like cover has been disclosed in a preferred embodiment and a modification thereof and that the covers are relatively easily formed and when installed on mechanical devices having movable extensions or arms with relatively movable and/or rotatable portions will safely and easily continuously protect the joints in the movable members or arms even though the relatively movable sections of the members or arms are moving at different angles with respect to one another and completely or partially rotated with respect to one another.

Although but two embodiments of the present invention have been illustrated and described, it will be apparent to those skilled in the art that various changes and modifications may be made therein without departing from the spirit of the invention and having thus described my invention what I claim is:

1. An improvement in a bellows-like flexible cover for a machine device having a movable joint therein to be covered, said cover comprising a plurality of centrally apertured annular flexible elements, some of which are affixed to one another at their outer peripheral edges and at their inner peripheral edges respectively to form a first bellows section of said cover and some of which are joined to one another at their outer peripheral edges and at their inner peripheral edges respectively to form a second bellows section of said cover, the improvement comprising a rotatable connection between said first and second bellows sections of said cover and comprising the disposition of one of said centrally apertured annular flexible elements on one end of one of said bellows sections of said cover between an attached pair of said centrally apertured annular flexible elements on an adjacent end of the other bellows section of said cover, a secondary centrally apertured annular flexible element attached at its outer peripheral edge to the outer peripheral edge of said centrally apertured annular flexible element disposed between said attached pair of centrally apertured annular flexible elements, an annular ring disposed in said area defined by said secondary centrally apertured annular flexible element adjacent its point of attachment to said centrally apertured flexible element disposed between said attached pair of centrally apertured annular flexible elements.

2. The improvement in a bellows-like flexible cover set forth in claim 1 and wherein said annular ring is rigid.

3. The improvement in a bellows-like flexible cover set forth in claim 1 and wherein said annular ring is resilient.

* * * * *